Nov. 3, 1931.  E. A. SPERRY  1,830,041
METHOD AND MEANS FOR IMPARTING INTELLIGENCE
Filed Nov. 18, 1924   2 Sheets-Sheet 1
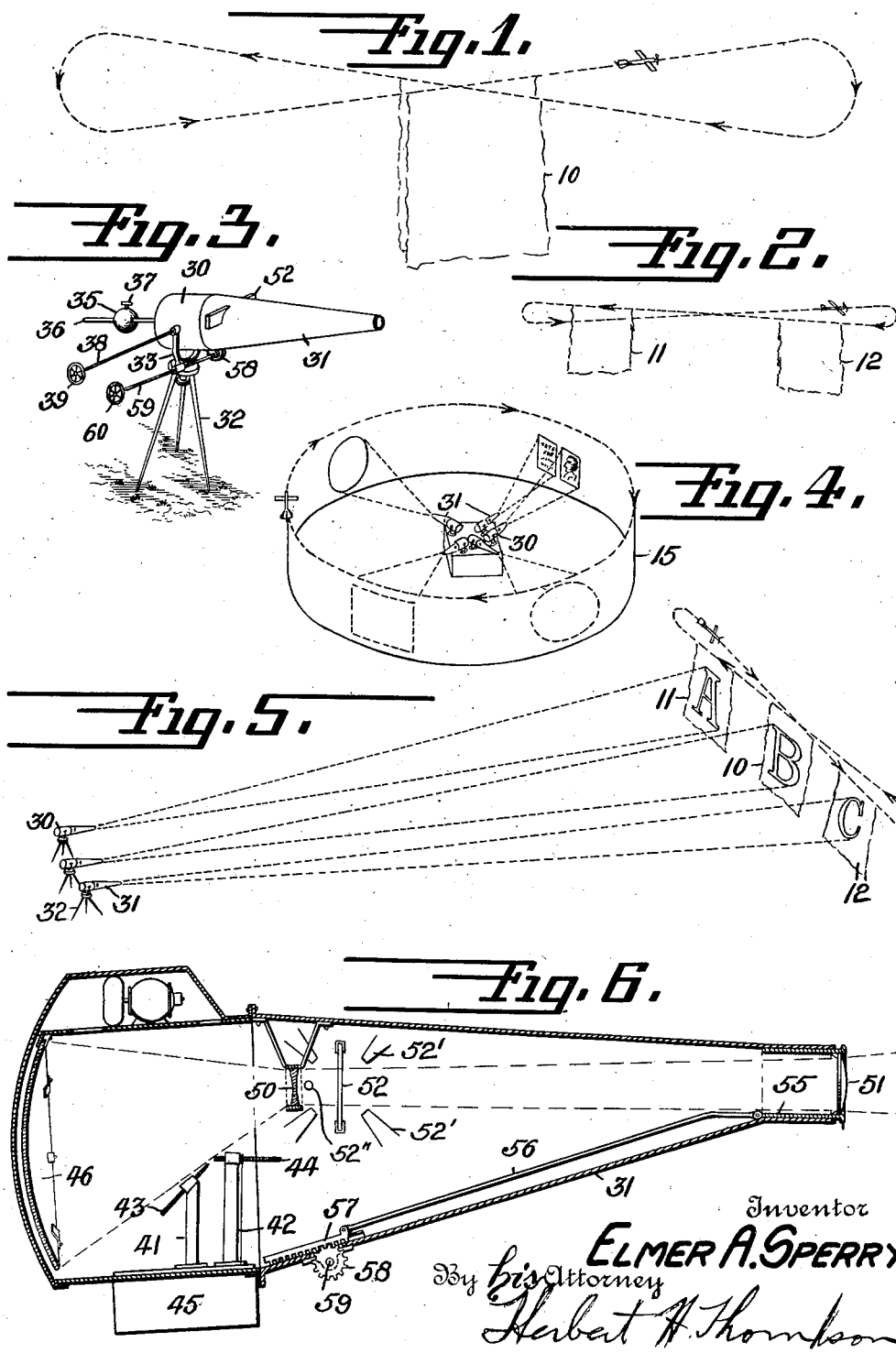
Inventor
ELMER A. SPERRY.
By his Attorney
Herbert H. Thompson Nov. 3, 1931.   E. A. SPERRY   1,830,041
METHOD AND MEANS FOR IMPARTING INTELLIGENCE
Filed Nov. 18, 1924   2 Sheets-Sheet 2

Inventor
ELMER A. SPERRY.
By his Attorney
Herbert H. Thompson

Patented Nov. 3, 1931

1,830,041

UNITED STATES PATENT OFFICE

ELMER A. SPERRY, OF BROOKLYN, NEW YORK, ASSIGNOR, BY MESNE ASSIGNMENTS, TO SPERRY GYROSCOPE COMPANY, INC., A CORPORATION OF NEW YORK

METHOD AND MEANS FOR IMPARTING INTELLIGENCE

Application filed November 18, 1924. Serial No. 750,695.

This invention relates generally to a method of and means for imparting intelligence which consists essentially in the formation of an air-borne or supported screen and projector means for throwing upon said screen various characters or symbols to be displayed. The invention is not limited to any particular type of screen but includes every type which employs a screen that is supported by air and which further can be readily laid or hung in any desired position in the atmosphere. Such a screen may be laid by a vessel, but my invention has been described in connection with an aircraft which can supply such a screen in any desired position over land or water in the atmosphere. My invention contemplates more particularly the provision of means for constantly renewing the screen if the latter is of the smoke or vapor type and likely to be dissipated.

My invention has for a further object the provision of means for supplying an air-supported screen or curtain with a plurality of projectors for utilizing individual and separate portions of said screen as separate units each imparting its own unit of intelligence.

A further object of my invention is the provision of projectors for use in the combination outlined above, which are so constructed that they are capable of projecting an image upon the screen without at the same time projecting a shadow from the image of the arc or arc lamp employed in said projector. It will be understood, of course, that the projecting lens system employed in said projector is one having extremely long conjugate foci, which may be several thousands of feet, depending upon the distance of the screen from the projector.

Other objects and advantages of this invention will be in part apparent and in part pointed out in the following detailed specification and it will be obvious that many features of my projector lamp have general application to the art of picture projection apparatus, especially where the screen is some distance from the projector.

In the accompanying drawings

Fig. 1 is a view illustrating one method of providing an air-borne or air-supported screen.

Fig. 2 is a view similar to Fig. 1 but showing the manner of providing a plurality of screens in the same plane.

Fig. 3 is a view of a projector in the form of an arc lamp adapted for the particular uses of this invention.

Fig. 4 illustrates the method of providing a plurality of air-supported curtains in a substantially circular plane so that all of said curtains are equi-distant from the co-operating projectors.

Fig. 5 is a view showing the method of projecting intelligence from a plurality of projectors onto a plurality of screens, which in this instance, are in the same vertical plane.

Fig. 6 is a vertical section through the projector of Fig. 3.

Figure 8:
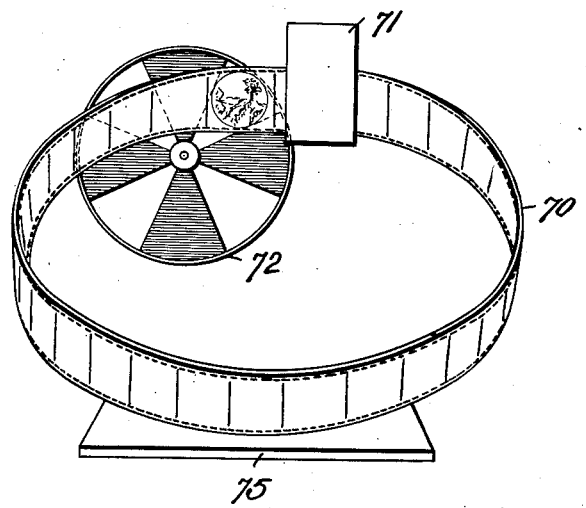
Fig. 8 is a front view of the device shown in Fig. 7.

Referring to the drawings I have illustrated my invention in connection with air-supported screens or curtains adapted to be hung or laid by aircraft although, as hereinbefore stated, other means may be devised. When employing aircraft for the purpose, the said craft may fly back and forth in a substantially figure 8 course, emitting at the same time a visible vapor having a density greater than air so that it descends gradually by gravity and forms a screen or curtain 10 sufficiently opaque to provide a background for images projected thereon. The means for providing this vapor is well known in the art and any suitable method of emitting a visible vapor may be employed. The aircraft retraces its course continually thus constantly replenishing the curtain or screen which would otherwise tend to be dissipated. Where but a single screen is to be employed it may be desirable to utilize that portion adjacent the lobes of the figure 8 as this portion is particularly dense and least subject to dissipation. When more screens than one are to be utilized then the screens 11, 12 formed along the lobes of the figure 8, as shown in Fig. 2, may be employed either alone or in connection with the central curtain at the intersection of the lobes as shown in Fig. 5. If desired the aircraft can fly continuously in the path of a circle so as to form a continuous curtain 15 in a circular plane, all of the points of which are substantially equidistant from the center. It will be apparent that any portion of such a screen may be employed as a background upon which images may be thrown.

Since these curtains are of huge size and the images correspondingly large, it may be necessary to employ a plurality of projectors as shown in Figs. 4 and 5. In Fig. 4 the projectors are so arranged as to throw the images radially from the central platform toward the circular screen. In Fig. 5 the projectors are arranged in alignment to project the images substantially equal distances to the aligned screens.

Because of the fact that the image is to be thrown a very long distance and because of the fact that it is not desired to project an image of the arc, it is necessary to modify in several particulars the reflector arc lamp when such lamp is utilized as the projector. Referring to Fig. 3, it will be observed that the lamp comprises a drum 30 having a conical forward extension 31, said drum and extension being universally mounted, and a support 32. Such mounting includes the pivoting of the drum for oscillation about a horizontal axis in bracket 33, which is in turn supported for rotation about a vertical axis in the support or stand 32. The weight of this conical extension 31 may be counterbalanced by a weight 35 attached to the rear end of the drum and adjustably supported upon a bar 36 by means of an adjustment screw 37. In order to permit the operator to actuate the lamp from a substantial distance so that he may view the image, there may be provided a remote control one form of which may consist of an arm 38 of any desired or suitable length fixed to the journals carried by drum 30 whereby said drum is supported in bracket 33 and having a handle 39 at its outer end so that by rotating the handle the drum will be oscillated about a horizontal axis. By merely taking hold of rod 36 or handle 39 and operating the drum about the vertical axis of the mounting of bracket 33 in stand 32 the drum may be adjusted in azimuth so that the image may be properly thrown upon the screen, or, if desired, so that the image may be thrown always upon the freshly laid portion of the screen which will necessitate movement of the projector in a direction to cause the image to follow the path of the craft employed in laying the screen. Remote control of the projectors is thereby obtained both in a vertical and a horizontal plane or in any combination of said planes.

Referring now to Fig. 6, there is mounted within the drum a suitable form of arc lamp mechanism, preferably of the high intensity type, which is shown as comprising the electrode holder 42 for the positive electrode 44 which normally faces the reflector, and the holder 41 for the negative holder 43 which is placed between the positive electrode and the reflector. Said arc is controlled and regulated by the usual mechanism in the control box 45. Preferably the negative electrode is positioned at a substantial angle to the positive so as to lie out of the incident beam between the crater of the positive electrode and the reflector. Adjacent the rear of the drum is supported a parabolic mirror or reflector 46 for projecting the rays from the arc through the slide or object to the objective. In order not to project an image or shadow from the arc lamp itself, it will be observed that the mirror is inclined slightly upwardly so that the arc and the entire arc lamp mechanism is to one side of the mirror axis. As shown, the arc lamp is so placed that the reflected rays from the mirror converge on a diverging or concave lens 50, which is placed fairly close to the reflector and on the opposite side of the axis of the reflector from the arc. The lens 50 transmits a beam of light which is only very slightly divergent through the slide or object holder 52, which may be carried by the extension 31 in front of said lens 50, said slide supporting an image producing element, such as a transparent plate or other object to be projected. The light then passes through the focusing or objective lens 51 at the front of the conical extension 31. It should be observed that the arc lamp mechanism is so placed with reference to the reflected beam from the mirror to the lens 50 as to lie entirely without said beam as indicated by the dotted line connecting the lower edge of the reflector with the lower edge of said lens. This is rendered possible not only by positioning the arc to one side of the optical axis of the reflector but also by so positioning it that the reflected rays converge rapidly, close to the reflector so that the lamp mechanism lies without the cone of the light produced thereby. The holder 52 is placed near the focus of lens 51 so that the conjugate focus of the image will be extremely long, perhaps several thousand feet, to permit operation of the device through great distances.

The adjustment or focusing of lens 51 may be accomplished by means such as a sleeve 55 in which said lens is mounted, said sleeve being slidable within the end of extension 31. The sleeve has pivotally connected thereto a link 56 whose other end engages a rack 57 with which meshes a pinion 58 at the end of an arm 59 which may be actuated by a handle 60. Said rod 59 may be of any suitable length to permit remote control. Any other suitable adjusting mechanism may also be employed in place of the adjusting mechanism shown.

Another requisite for projection at great distances is a light source of the highest intensity which means that great heat at the point of reconcentration of the beam at plate 52 and lens 50. It has been definitely determined that only stencils cut in thin metal will withstand this heat for "stills" when the plate remains in the beam unless high intensity cooling means is employed. One such method may consist in directing air jets upon the plate as shown at 52' to sweep away the heat and preserve the film or plate. A jet such as 52" applied on either one or both sides of lens 50 may also be employed for the purpose of keeping the temperature of said lens within limits. The cooling means for the image producing element and for the lens may be operated from the same source of power that is employed for operating the lamp mechanism rotating the carbons and ventilating the drum.

Figure 7:
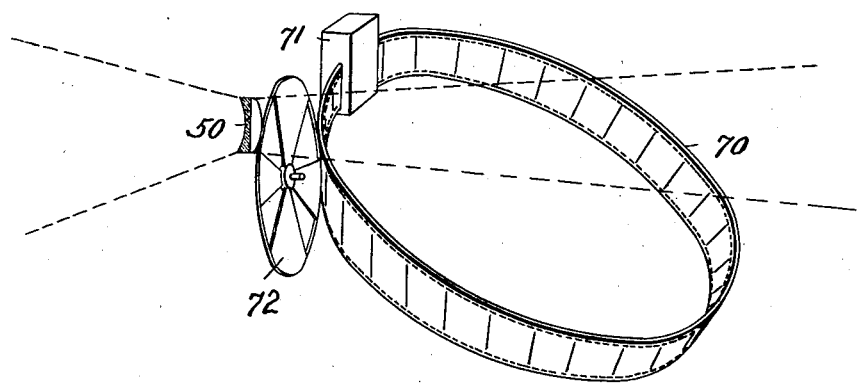
Fig. 7 is a perspective view, largely diagrammatic and with parts omitted, of a modified form of my invention particularly designed to solve the problem of cooling the plate or film.

An alternative method of cooling is to run a film either from reel to reel or in the form of an endless band as illustrated in Fig. 7 where a moving film 70 is operated in place of the stencil or plate 52 as by a suitable intermittent driving mechanism 71 synchronizing with a shutter 72 of the motion picture type. Where the image to be projected is to be a still picture, each unit of the band 70 will bear the same picture, but where the projected image is to be a moving picture, each unit of the band will be progressively different from the preceding units. When an endless band is used one side thereof will pass through casing 31 in place of slide 52 while the opposite side will be deflected, preferably by its own weight, so that it is positioned outside of the beam. The film outside the casing may be supported in any suitable manner as by brackets 75. By this method each film or plate unit of the band is exposed only instantaneously so that over-heating of the film will not take place. This system may be employed either alone or in connection with the air jets 52', 52" hereinbefore described.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a projector for projecting images on distant clouds, smoke or other screens, a reflector, an objective, a source of light positioned to one side of the axis of said reflector, and a concave lens positioned on the opposite side of said axis to transmit substantially parallel rays through the object to said objective.

2. In a projector for projecting images on distant clouds, smoke or other screens, a reflector, an arc lamp with all parts thereof positioned to one side of the axis of said reflector, and an object holder positioned on the other side of said axis in the path of the reflected beam, said lamp being entirely without the path of the beam striking the said object holder.

3. In a projector, a reflector, an objective, a source of light positioned to one side of the axis of said reflector, a lens positioned on the oppoiste side of said axis, and an object holder positioned between said lens and said objective.

4. In a projector, a reflector, an object holder, an objective, an arc lamp positioned with all parts thereof to one side of the optical axis of said reflector, and a concave lens positioned on the opposite side of said axis and adapted to collect only the converging rays from said reflector which do not strike said lamp and to transmit the rays through the object holder to the objective.

5. In a projector for projecting the image of an object on a distant cloud, smoke screen or other object, a reflector, an arc lamp comprising a positive electrode holder facing the reflector and positioned without the beam from said reflector, and a negative holder facing the first named holder and inclined at such an angle thereto that the negative electrode and holder lie without both the incident and reflected beams from the positive electrode.

6. In a projector, a reflector, an objective, and an arc lamp between said reflector and objective, said lamp comprising a positive electrode facing the reflector and a negative electrode between said positive electrode and the reflector and positioned at a sufficient angle thereto to lie out of the incident beam from the positive electrode, both of said electrodes lying without the beam reflected by said reflector.

7. In a projector for projecting the image of an object on a distant cloud, smoke screen or other object, a reflector, an arc lamp comprising a positive electrode facing the reflector and a negative electrode between the positive electrode and the reflector, an object holder in front of said reflector and beyond said arc lamp, and an objective lens, the said holder being placed near the focus of said lens so that the conjugate focus of the image is very long, said lamp being positioned out of focus with respect to said reflector and said reflector being designed to reflect a converging beam whereby the arc lamp image or shadow is prevented from being projected with the projection of the object.

8. In a projector for projecting the image of an object on a distant cloud, smoke or other screen, comprising a high intensity arc lamp mechanism, a reflector, a spread lens, an image-producing element, means for supporting said element in the concentrated beam of said projector beyond said lens, and means for directing an air stream against said element for cooling the same.

In testimony whereof I have affixed my signature.

ELMER A. SPERRY.